(12) United States Patent
Zheng et al.

(10) Patent No.: US 9,425,686 B2
(45) Date of Patent: Aug. 23, 2016

(54) VOLTAGE CONVERSION DEVICE AND METHOD FOR ADJUSTING COMMON MODE NOISE IMPEDANCE

(71) Applicant: Huawei Technologies Co., Ltd., Shenzhen, Guangdong (CN)

(72) Inventors: Feng Zheng, Xi'an (CN); Changsheng Pei, Shenzhen (CN); Yongfa Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 117 days.

(21) Appl. No.: 14/577,773

(22) Filed: Dec. 19, 2014

(65) Prior Publication Data

US 2015/0103571 A1    Apr. 16, 2015

Related U.S. Application Data

(63) Continuation of application No. PCT/CN2014/073240, filed on Mar. 11, 2014.

(30) Foreign Application Priority Data

Aug. 21, 2013 (CN) .......................... 2013 1 0367732

(51) Int. Cl.
*H01F 27/02* (2006.01)
*H02M 1/44* (2007.01)
(Continued)

(52) U.S. Cl.
CPC ................. *H02M 1/44* (2013.01); *H01F 27/02* (2013.01); *H02M 1/126* (2013.01); *H02M 3/155* (2013.01); *H02M 2001/0064* (2013.01); *H02M 2001/123* (2013.01)

(58) Field of Classification Search
CPC ............................................ H01F 27/00–27/30
USPC ....................... 336/65, 83, 200, 225–229, 232
See application file for complete search history.

(56) References Cited

U.S. PATENT DOCUMENTS

| 2003/0038699 A1 | 2/2003 | Nakatsu et al. |
| 2011/0080244 A1 | 4/2011 | Chen et al. |
| 2013/0010506 A1 | 1/2013 | Sakai et al. |

FOREIGN PATENT DOCUMENTS

| CN | 101093235 A | 12/2007 |
| CN | 101197205 A | 6/2008 |

(Continued)

OTHER PUBLICATIONS

Sheng Ye, et al., "A Novel EMI Filter Design Method for Switching Power Supplies", IEEE Transactions on Power Electronics, vol. 19, No. 6, Nov. 2004, p. 1668-1678.

(Continued)

*Primary Examiner* — Tuyen Nguyen (57) ABSTRACT

The present invention provides a voltage conversion device and a method for adjusting common mode noise impedance, which relates to the circuit field, and enables a common mode impedance value of a noise source and an impedance value of an EMI filter to enter a mismatch state, so as to reduce a restriction on design of the EMI filter, so that a size of the EMI filter is smaller and utilization efficiency of the EMI filter is higher. The method is: adjusting a common mode impedance value of a noise source by adjusting a balanced impedance value in a balanced winding on a voltage conversion device, so as to enable the common mode impedance value of the noise source and an impedance value of an EMI filter to enter a mismatch state.

10 Claims, 5 Drawing Sheets

(51) Int. Cl.
*H02M 1/12* (2006.01)
*H02M 3/155* (2006.01)
*H02M 1/00* (2006.01)

(56) References Cited

FOREIGN PATENT DOCUMENTS

| | | |
|---|---|---|
| CN | 202004639 U | 10/2011 |
| CN | 102244469 A | 11/2011 |
| CN | 202384987 U | 8/2012 |
| CN | 102844975 A | 12/2012 |
| CN | 103208913 A | 7/2013 |
| CN | 103457454 A | 12/2013 |
| EP | 2 512 025 A1 | 10/2012 |
| JP | 2009135271 A | 6/2009 |

OTHER PUBLICATIONS

C. Khun, et al., "Passive EMI Filter Performance Improvements with Common Mode Voltage Cancellation Technique for PWM Inverter", Power Electronics and Drive Systems, Nov. 27, 2007, p. 257-261.

VOLTAGE CONVERSION DEVICE AND METHOD FOR ADJUSTING COMMON MODE NOISE IMPEDANCE

CROSS-REFERENCE TO RELATED APPLICATIONS

This application is a continuation of International Application No. PCT/CN2014/073240, filed on Mar. 11, 2014, which claims priority to Chinese Patent Application No. 201310367732.X, filed on Aug. 21, 2013, both of which are hereby incorporated by reference in their entireties.

TECHNICAL FIELD

The present invention relates to the circuit field, and in particular, to a voltage conversion device and a method for adjusting common mode noise impedance.

BACKGROUND

With the continuous increase of a frequency of a switching power supply, an EMI (Electromagnetic Interference) electromagnetic interference problem is increasingly serious. A traditional method is to add an EMI filter into a system to suppress noise. In order for the filter to suppress the noise to a greatest extent, a designer must select a most appropriate EMI filter according to an impedance mismatch principle. Noise source impedance, load end impedance, and input/output impedance of an EMI filter are key factors for adjusting and configuring performance of the EMI filter according to the impedance mismatch principle.

To resolve the electromagnetic interference problem, a common practice in the industry currently is to select a corresponding type of EMI filter according to high impedance or low impedance of noise source impedance and load impedance. To maximally reduce the EMI in the switching power supply, the designer must select multiple different filters to perform comparison, that is, to adjust an impedance characteristic of an EMI filter from a perspective of the filter, and finally select an EMI filter that is most suitable for the system.

In a process of resolving the electromagnetic interference problem, the inventor finds that at least the following problems exist in the prior art:

In the prior art, an EMI filter is designed according to the impedance mismatch principle, and impedance of the filter is adjusted to achieve maximum mismatch between noise source impedance and input impedance of the EMI filter, and between output impedance of the EMI filter and load impedance. However, the noise source impedance cannot be accurately described currently. In addition, waste of costs and time caused in a type selection comparison test of the EMI filter for the system enables design to be inappropriate and have low efficiency. If over design is selected for the EMI filter to save time and costs, that is, a large margin is reserved when the EMI filter is designed, in this case, a size of the EMI filter becomes very large.

SUMMARY

Embodiments of the present invention provide a voltage conversion device and a method for adjusting common mode noise impedance, which enables a common mode impedance value of a noise source and an impedance value of an EMI filter to enter a mismatch state, so as to relax restrictions on design of the EMI filter, so that a size of the EMI filter is smaller and utilization efficiency of the EMI filter is higher.

To achieve the foregoing objectives, the embodiments of the present invention adopt the following technical solutions:

According to a first aspect, a voltage conversion device is provided, including:

a common mode impedance regulator and an electromagnetic interference filter, where the common mode impedance regulator includes an E-E magnetic core, a first coil, a second coil, a balanced winding coil, and a variable resistor, where the E-E magnetic core includes a first magnetic cylinder, a second magnetic cylinder, and a central cylinder, the first coil and the second coil are wound around the first magnetic cylinder and the second magnetic cylinder respectively, a first wiring terminal and a second wiring terminal are led out of the first coil wound around the first magnetic cylinder, a third wiring terminal and a fourth wiring terminal are led out of the second coil wound around the second magnetic cylinder, a distance between the second wiring terminal and the balanced winding is less than a distance between the first wiring terminal and the balanced winding, and a distance between the fourth wiring terminal and the balanced winding is less than a distance between the third wiring terminal and the balanced winding;

the balanced winding coil, being wound, in an 8-shaped manner, on the first magnetic cylinder and the second magnetic cylinder of the E-E magnetic core without passing through the central cylinder of the E-E magnetic core, where one end of the balanced winding coil is connected to a slidable pin of the variable resistor, and the other end of the balanced winding coil is connected to either pin of two non-slidable pins of the variable resistor; and the electromagnetic interference filter, being connected to the common mode impedance regulator by using the second wiring terminal and the fourth wiring terminal, where a noise source is connected to the common mode impedance regulator by means of the first wiring terminal and the third wiring terminal.

In a first possible implementation manner, with reference to the first aspect, an air gap is opened in the central cylinder of the E-E magnetic core or the central cylinder of the E-E magnetic core is separated in between; and an air gap is opened in a side cylinder of the E-E magnetic core or the side cylinder of the E-E magnetic core is separated in between.

In a second possible implementation manner, with reference to the first aspect or the first possible implementation manner of the first aspect, the variable resistor includes a slide rheostat, a rheostat box, and a potentiometer.

In a third possible implementation manner, with reference to the first aspect or the first or second possible implementation manner of the first aspect, the central cylinder is located between the first magnetic cylinder and the second magnetic cylinder.

According to a second aspect, a method for adjusting common mode noise impedance is provided and applied to the voltage conversion device in the first aspect or in any one of the first to the third possible implementation manners of the first aspect, and the method includes:

receiving, from a second wiring terminal and a fourth wiring terminal, a common mode current that includes noise;

coupling the common mode current onto a balanced winding coil by using a first coil and a second coil; and enabling noise impedance of the common mode current and impedance of an electromagnetic interference filter to enter a mismatch state by adjusting an impedance value of a variable resistor on the balanced winding coil.

In a first possible implementation manner, with reference to the second aspect, the enabling noise impedance of the common mode current and impedance of an electromagnetic interference filter to enter a mismatch state by adjusting an impedance value of a variable resistor on the balanced winding coil includes:

adjusting the impedance value of the variable resistor to enable an equivalent impedance value of the noise source to be equal to an equivalent impedance value of the electromagnetic interference filter, so that a reflection factor of the noise source is zero, and a best filtering effect of the electromagnetic interference filter is achieved.

In the voltage conversion device and the method for adjusting common mode noise impedance provided in the embodiments of the present invention, a common mode impedance value of a noise source is adjusted by adjusting a balanced impedance value in a balanced winding on the voltage conversion device, to enable the common mode impedance value of the noise source and an impedance value of an EMI filter to enter a mismatch state, so as to reduce a restriction on design of the EMI filter, so that a size of the EMI filter is smaller and utilization efficiency of the EMI filter is higher.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

A traditional EMI filter system is formed of three parts: a noise source, an EMI (Electro-Magnetic Interference, electromagnetic interference) filter, and an LISN (Line Impedance Stabilization Network, line impedance stabilization network).

Assuming that impedance of the noise source is $Z_n$, input equivalent impedance of the EMI filter is $Z_{in}$, and equivalent impedance of the LISN is $Z_L$, a reflection factor at the noise source end $$\Gamma = \frac{Z_n - Z_{in}}{Z_n + Z_{in}}.$$

When $Z_n = Z_{in}$, that is, the reflection factor is $\Gamma=0$, all noise made from the noise source passes through the EMI filter, and the EMI filter cannot work normally.

When $Z_n \neq Z_{in}$, that is, the reflection factor $\Gamma \neq 0$, a part of the noise made from the noise source is reflected back to the noise source, but is not transmitted to the LISN side.

When the impedance $Z_n$ of the noise source and the input equivalent impedance $Z_{in}$ of the EMI filter enter a maximum mismatch state, almost none of noise signals sent from the noise source is transmitted to the LISN side.

The embodiments of the present invention are used to adjust impedance of a noise source to enable the impedance of the noise source and input equivalent impedance of an EMI filter to enter a mismatch state.

Figure 1:
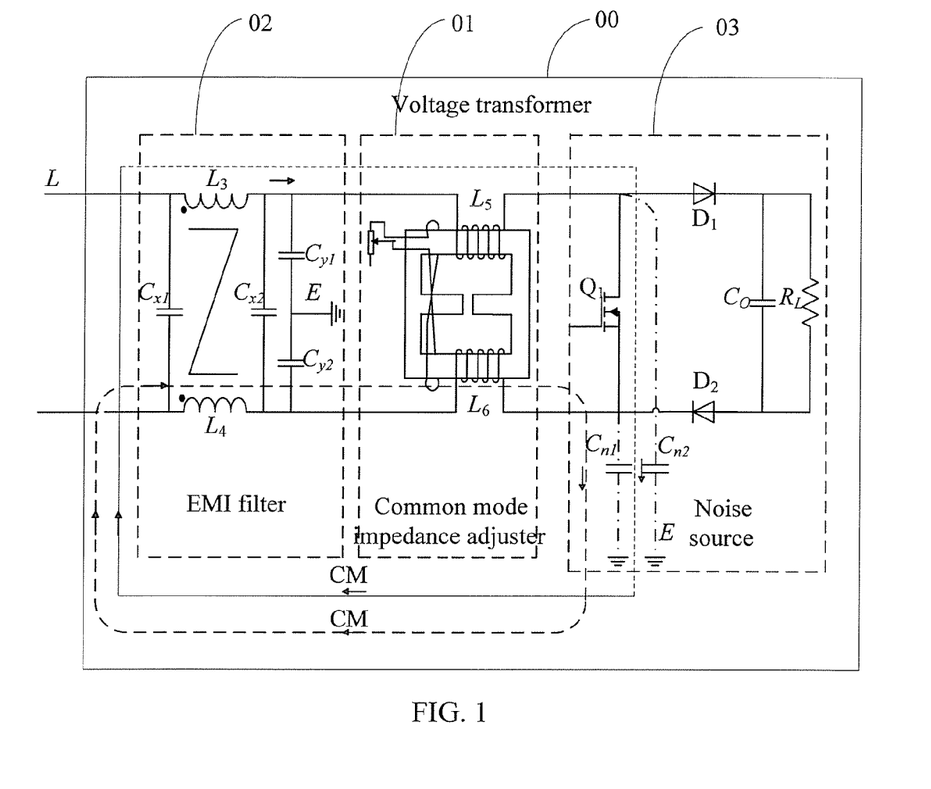
FIG. 1 is a first schematic structural diagram of a voltage conversion device according to an embodiment of the present invention.
Figure 2:
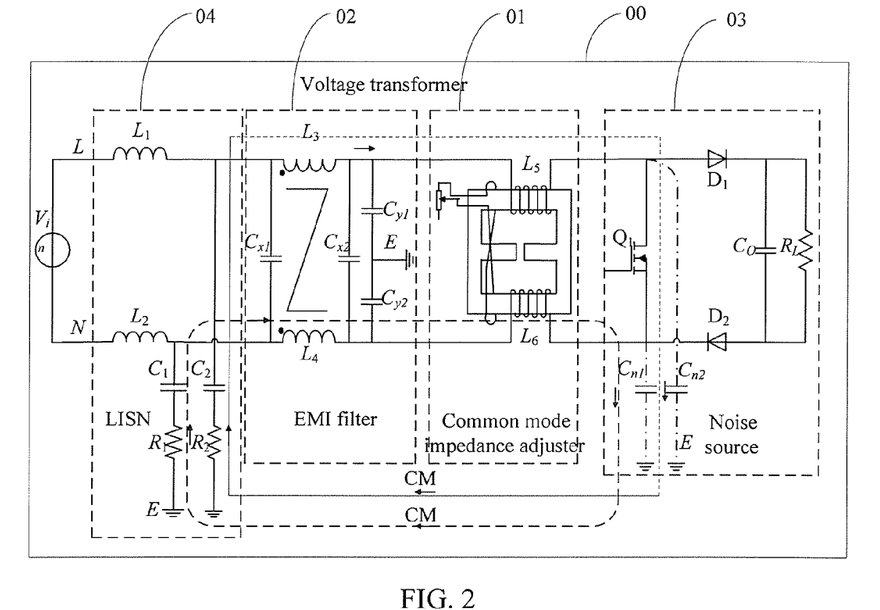
FIG. 2 is a second schematic structural diagram of a voltage conversion device according to an embodiment of the present invention.

An embodiment of the present invention provides a voltage conversion device 00. As shown in FIG. 1, the voltage conversion device can be applied to the fields of direct current-to-direct current, direct current-to-alternate current, alternate current-to-alternate current, and alternate current-to-direct current voltage conversion devices, where the voltage conversion device 00 includes:

a common mode impedance regulator 01, an EMI filter 02, and a noise source 03, where L represents a live wire, N represents a neutral wire, one end of the common mode impedance regulator 01 is connected to the noise source, and the other end of the common mode impedance regulator 01 is connected to the EMI filter 02. As shown in FIG. 2, when the voltage conversion device 00 is tested, the voltage conversion device 00 may also be connected to a linear impedance stabilization network 04. The linear impedance stabilization network 04 is used to enable indicator performance of each part of the voltage conversion device 00 to meet a delivery standard before delivery from a factory.

Figure 3:
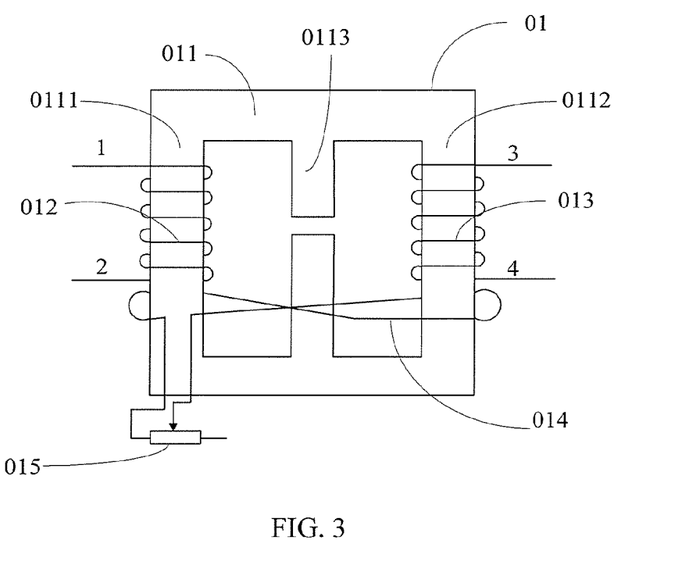
FIG. 3 is a first schematic structural diagram of a common mode impedance regulator according to an embodiment of the present invention.

As shown in FIG. 3, the common mode impedance regulator 01 includes an E-E magnetic core 011, a first coil 012, a second coil 013, a balanced winding coil 014, and a variable resistor 015.

The E-E magnetic core 011 includes a first magnetic cylinder 0111, a second magnetic cylinder 0112, and a central cylinder 0113, an air gap may be opened in a middle position of the central cylinder 0113, and the central cylinder 0113 may also be disconnected, air gaps may be opened in middle positions of the first magnetic cylinder 0111 and the second magnetic cylinder 0112, and the first cylinder 0111 and the second cylinder 0112 may also be disconnected, the first coil 012 and the second coil 013 are wound around the first magnetic cylinder 0111 and the second magnetic cylinder 0112 respectively, a first wiring terminal 1 and a second wiring terminal 2 are led out of the first coil 012 wound around the first magnetic cylinder 0111, a third wiring terminal 3 and a fourth wiring terminal 4 are led out of the second coil 013 wound around the second magnetic cylinder 0112, where a distance between the second wiring terminal 2 and the balanced winding coil 014 is less than a distance between the first wiring terminal 1 and the balanced winding coil 014, and a distance between the fourth wiring terminal 4 and the balanced winding coil 014 is less than a distance between the third wiring terminal 3 and the balanced winding coil 014.

The first coil 012, the second coil 013, and the balanced winding coil 014 are inductance coils. A current may be coupled from the first coil 012 and the second coil 013 onto the balanced winding coil 014 under an inductance effect. The balanced winding coil 014 may be wound, in an 8-shaped manner, around the central cylinder 0113 of the E-E magnetic core 011 without passing through the central cylinder 0113 of the E-E magnetic core. Two wiring terminals are led out of the balanced winding coil 014 and connected to the variable resistor 015.

Using a boost transformer in the direct current-to-direct current voltage conversion device field as an example, an air gap is opened in a middle position of the central cylinder 0113 of the E-E magnetic core 011, and the central cylinder 0113 is separated in between in the middle of the central cylinder 0113. The variable resistor 015 connected into the balanced winding coil 014 includes a slide rheostat, a rheostat box, and a potentiometer.

Figure 4:
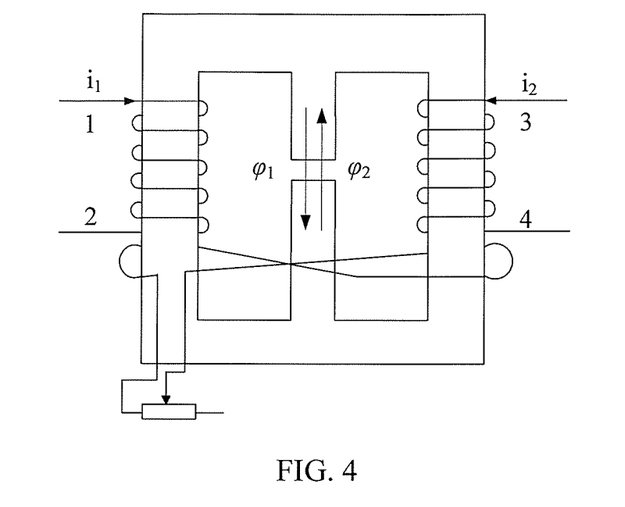
FIG. 4 is a second schematic structural diagram of a common mode impedance regulator according to an embodiment of the present invention.

As shown in FIG. 4, when the first coil 012 and the second coil 013 work in a common mode, that is, a current $i_1$ flows in from a terminal 1, a current $i_2$ flows in from a terminal 3, a flux generated by the current is $i_1$ is $\Phi_1$, and a flux generated by the current $i_2$ is $\Phi^2$. If an upward direction of the flux is taken as a positive direction, an equivalent magnetomotive force generated by the first coil 012 is positive in an upward direction and negative in a downward direction, and an equivalent magnetomotive force generated by the second coil 013 is negative in an upward direction and positive in a downward direction. In this case, an equivalent diagram of a voltage source reluctance of the common mode noise regulator 01 is shown in FIG. 5, where $R_1$ and $R_2$ represent equivalent reluctances of a side cylinder 0111 and a side cylinder 0112 respectively, R represents an equivalent reluctance of the central cylinder 0113, and $F_1$ and $F_2$ represent equivalent voltage sources of the first coil 012 and the second coil 013.

Figure 5:
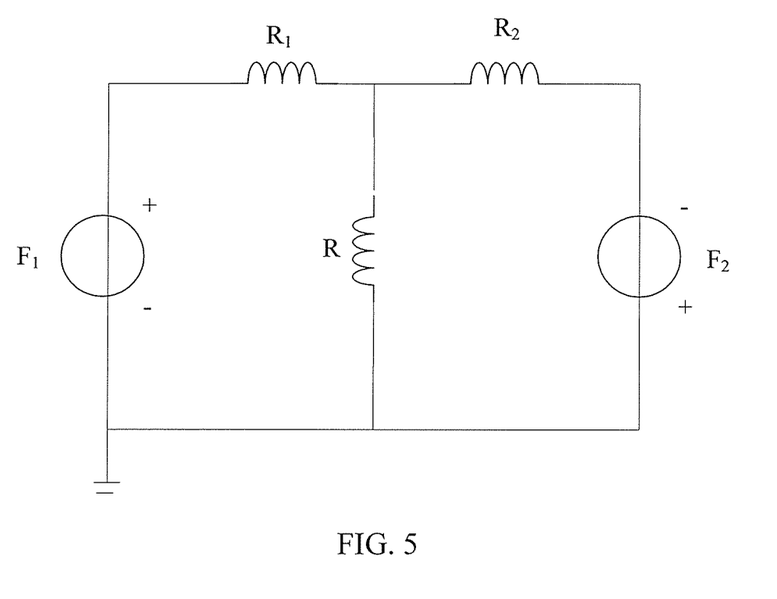
FIG. 5 is a first equivalent schematic diagram of a common mode impedance regulator according to an embodiment of the present invention.
Figure 6:
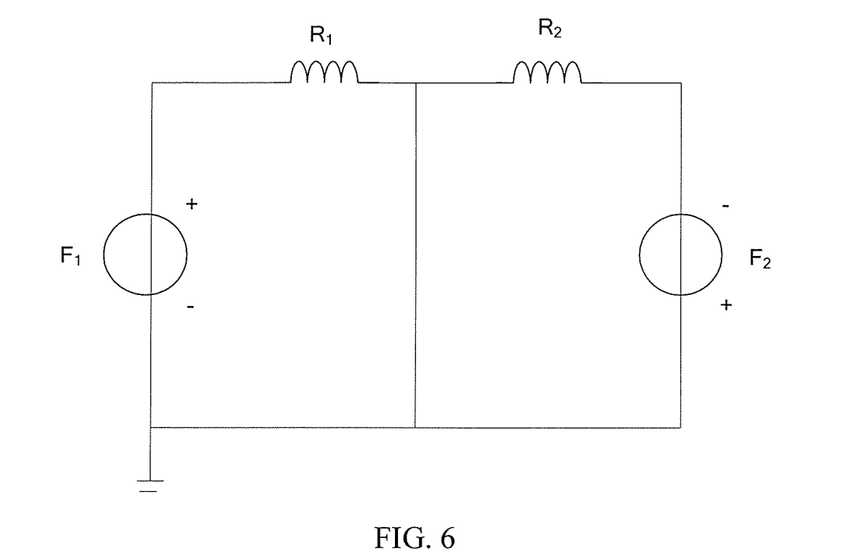
FIG. 6 is a second equivalent schematic diagram of a common mode impedance regulator according to an embodiment of the present invention.

When the equivalent magnetomotive force generated by the first coil 012 and the equivalent magnetomotive force generated by the second coil 013 work simultaneously, an equivalent diagram of the voltage source reluctance of the common mode noise regulator 01 in FIG. 5 may be further simplified into a diagram in FIG. 6. If influence on leakage inductance is ignored, for a common mode current, a total equivalent inductance from the terminal 1 and the terminal 2 or from a terminal 3 and a terminal 4 is:

$$L_\Sigma = 2 \times \frac{\psi}{i} = 2 \times \frac{n \times ni}{R_1} \frac{1}{i} = \frac{2n^2}{R_1}$$

That is, for a common mode noise current of a common mode noise source, the common mode noise regulator 01 has a better effect on common mode noise impedance of the common mode noise source.

Figure 7:
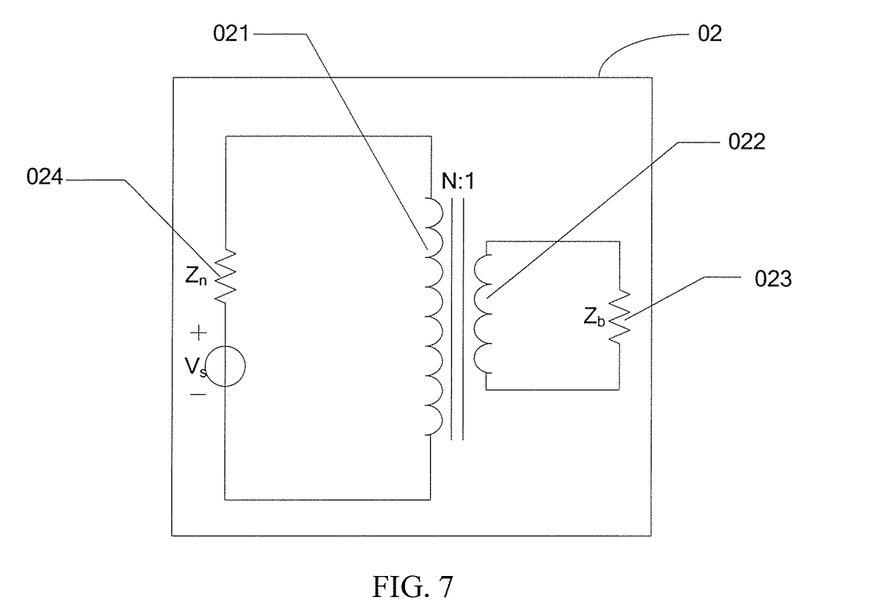
FIG. 7 is a third equivalent schematic diagram of a common mode impedance regulator according to an embodiment of the present invention.

When the common mode current flows in from the terminal 2 and the terminal 4, the common mode noise regulator 01 is equivalent to a model of a transformer 02. As shown in FIG. 7, the first coil 012 and the second coil 013 may be equivalent to a primary side power inductor 021 of the transformer 02, a balanced winding coil is equivalent to a secondary side inductor 022 of the transformer 02, balanced impedance 023 in the transformer 02 is $Z_b$, impedance of a noise source 024 is $Z_n$, and a turns ratio of the primary side power inductor 021 to the secondary side inductor 022 is N:1.

Therefore, an impedance value Zb of the balanced impedance 023 is equivalent to $$\frac{Z_b}{N^2}$$

on the primary side. In this case, equivalent impedance of the noise source 024 on the primary side is $$Z_n + \frac{Z_b}{N^2}.$$

Therefore, an impedance value of the noise source 024 may be adjusted by adjusting the impedance value of the balanced impedance 023.

In the voltage conversion device provided in the present invention, a common mode impedance value of a noise source is adjusted by adjusting a balanced impedance value in a balanced winding on the voltage conversion device, to enable a common mode impedance value of the noise source and an impedance value of an EMI filter to enter a mismatch state, so as to reduce a restriction on design of the EMI filter, so that a size of the EMI filter is smaller and utilization efficiency of the EMI filter is higher.

Figure 8:
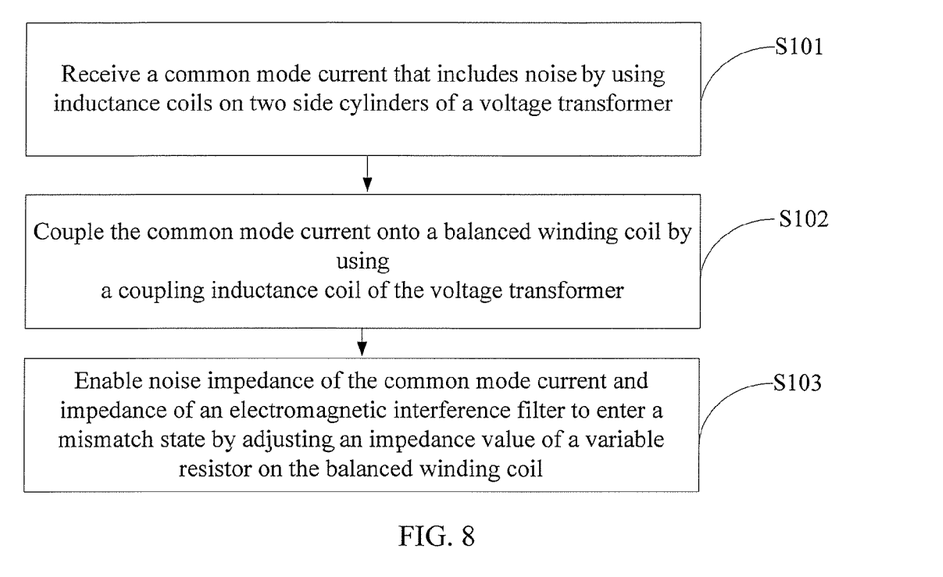
FIG. 8 is a schematic flowchart of a method for adjusting common mode noise impedance according to an embodiment of the present invention.

An embodiment of the present invention provides a method for adjusting common mode noise impedance, which is applied to the voltage conversion device 00 provided in the embodiment of the present invention. As shown in FIG. 8, the method includes:

S101. Receive a common mode current that includes noise by using inductance coils on two side cylinders of a voltage conversion device.

Specifically, S101 may be implemented by the following method:

the common mode current that includes noise is received by using a second wiring terminal and a fourth wiring terminal of the voltage conversion device.

S102. Couple the common mode current onto a balanced winding coil by using a coupling inductance coil of the voltage conversion device.

Specifically, S102 may be implemented by the following method:

coupling the common mode current onto a balanced winding coil by using a first coil and a second coil of the voltage conversion device.

S103. Enable noise impedance of the common mode current and impedance of an electromagnetic interference filter to enter a mismatch state by adjusting an impedance value of a variable resistor on the balanced winding.

Specifically, S103 may be implemented by the following method:

adjusting the impedance value of the variable resistor of the voltage conversion device to minimize a difference between an equivalent impedance value of a noise source and an equivalent impedance value of the electromagnetic interference filter, so as to enable a reflection factor of the noise source to approach zero as far as possible, so that a better filtering effect of the electromagnetic interference filter is achieved, where when the equivalent impedance value of the noise source is adjusted to be equal to the equivalent impedance value of the electromagnetic interference filter, the reflection factor of the noise source is zero, and a best filtering effect of the electromagnetic interference filter is achieved.

In the method for adjusting common mode noise impedance provided in the present invention, an impedance value of a common mode noise source is adjusted by adjusting a balanced impedance value in a balanced winding coil on the voltage conversion device, to enable a common mode impedance value of the noise source and an impedance value of an EMI filter to enter a mismatch state, so as to reduce a restriction on design of the EMI filter, so that a size of the EMI filter is smaller and utilization efficiency of the EMI filter is higher.

In the several embodiments provided in the present application, it should be understood that the disclosed method, apparatus, and system may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware plus a software functional unit.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A voltage conversion device, comprising:
a common mode impedance regulator and an electromagnetic interference filter, wherein the common mode impedance regulator comprises an E-E magnetic core, a first coil, a second coil, a balanced winding coil, and a variable resistor, wherein the E-E magnetic core comprises a first magnetic cylinder, a second magnetic cylinder, and a central cylinder, the first coil and the second coil are wound around the first magnetic cylinder and the second magnetic cylinder respectively, a first wiring terminal and a second wiring terminal are led out of the first coil wound around the first magnetic cylinder, a third wiring terminal and a fourth wiring terminal are led out of the second coil wound around the second magnetic cylinder, a distance between the second wiring terminal and the balanced winding is less than a distance between the first wiring terminal and the balanced winding, and a distance between the fourth wiring terminal and the balanced winding is less than a distance between the third wiring terminal and the balanced winding;

the balanced winding coil, being wound, in an 8-shaped manner, on the first magnetic cylinder and the second magnetic cylinder of the E-E magnetic core without passing through the central cylinder of the E-E magnetic core, wherein one end of the balanced winding coil is connected to a slidable pin of the variable resistor, and the other end of the balanced winding coil is connected to either pin of two non-slidable pins of the variable resistor; and the electromagnetic interference filter, being connected to the common mode impedance regulator by using the second wiring terminal and the fourth wiring terminal, wherein a noise source is connected to the common mode impedance regulator by means of the first wiring terminal and the third wiring terminal.

2. The transformer according to claim 1, wherein:
an air gap is opened in the central cylinder of the E-E magnetic core; and
an air gap is opened in a side cylinder of the E-E magnetic core.

3. The transformer according to claim 1, wherein the variable resistor comprises a slide rheostat, a rheostat box, and a potentiometer.

4. The transformer according to claim 2, wherein the variable resistor comprises a slide rheostat, a rheostat box, and a potentiometer.

5. The transformer according to claim 1, wherein:
the central cylinder is located between the first magnetic cylinder and the second magnetic cylinder.

6. The transformer according to claim 2, wherein:
the central cylinder is located between the first magnetic cylinder and the second magnetic cylinder.

7. The transformer according to claim 3, wherein:
the central cylinder is located between the first magnetic cylinder and the second magnetic cylinder.

8. The transformer according to claim 4, wherein:
the central cylinder is located between the first magnetic cylinder and the second magnetic cylinder.

9. A method for adjusting common mode noise impedance, wherein the method is applied to the voltage conversion device according to claim 1, and the method comprises:
receiving, from a second wiring terminal and a fourth wiring terminal, a common mode current that comprises noise;
coupling the common mode current onto a balanced winding coil by using a first coil and a second coil; and
enabling noise impedance of the common mode current and impedance of an electromagnetic interference filter to enter a mismatch state by adjusting an impedance value of a variable resistor on the balanced winding coil.

10. The method according to claim 9, wherein enabling noise impedance of the common mode current and impedance of an electromagnetic interference filter to enter a mismatch state by adjusting an impedance value of a variable resistor on the balanced winding coil comprises:
adjusting the impedance value of the variable resistor to enable an equivalent impedance value of a noise source is equal to an equivalent impedance value of the electromagnetic interference filter and to enable a reflection factor of the noise source to be zero, so that a best filtering effect of the electromagnetic interference filter is achieved.

* * * * *